United States Patent [19]

Tabota

[11] Patent Number: 5,083,467
[45] Date of Patent: Jan. 28, 1992

[54] PIEZO-ELECTRIC TYPE OF PRESSURE SENSOR AND PRESSURE-DETECTING DEVICE EMPLOYING THE SAME

[75] Inventor: Jun Tabota, Kyoto, Japan

[73] Assignee: Murata Manufacturing Co. Ltd., Japan

[21] Appl. No.: 398,742

[22] Filed: Aug. 25, 1989

[51] Int. Cl.⁵ ................................................ G01L 5/16
[52] U.S. Cl. ................................ 73/862.04; 73/862.64
[58] Field of Search ................ 73/862.04, 172, 862.35, 73/862.54, 862.62, 862.65, 862.64; 128/782

[56] References Cited

U.S. PATENT DOCUMENTS 4,843,891 7/1989 Brunner et al. .................. 73/862.04

FOREIGN PATENT DOCUMENTS 0297735 12/1987 Japan ............................... 73/862.04

Primary Examiner—Donald O. Woodiel
Attorney, Agent, or Firm—Ostrolenk, Faber, Gerb & Soffen

[57] ABSTRACT

A piezo-electric type of pressure sensor comprises a plurality of piezo-electric sensor elements arranged in a matrix. Each piezo-electric sensor element comprises a piezo-electric element and a switching transistor connected to the piezo-electric element. The piezo-electric type of pressure sensor comprises control lines provided in for each row of a plurality of piezo-electric sensor elements arranged in matrix, and for controlling the switching transistors and reading lines provided in for each column and whose connections to the piezo-electric elements are switched by means of switching transistors. A piezo-electric element which charge is to be measured selected by a control line is connected to a reading line by means of a switching transistor so that a charge generated in the piezo-electric element is detected. A capacitor is connected across each piezo element for receiving and storing the generated charge. An integrator is also connected to the matrix for accumulating the charge that is currently being read.

17 Claims, 4 Drawing Sheets

PIEZO-ELECTRIC TYPE OF PRESSURE SENSOR AND PRESSURE-DETECTING DEVICE EMPLOYING THE SAME

CROSS-REFERENCE TO RELATED APPLICATION

The present application relates to co-pending and commonly-assigned U.S. patent application Ser. No. 07/398,741, filed Aug. 25, 1989, entitled "PRESSURE DISTRIBUTION DETECTING DEVICE" by Jun Tabota.

BACKGROUND OF THE INVENTION

1. Field of the Invention

The present invention relates to a piezo-electric type of pressure sensor, and, more specifically, to a piezo-electric type of pressure sensor in which a plurality of sensor elements arranged in a matrix detect a distribution of contact pressure, and to a pressure-detecting device employing such a piezo-electric type of pressure sensor.

2. Description of the Background Art

FIG. 7 shows a piezo-electric type of pressure-distribution sensor in which piezo-electric elements are arranged in a matrix for detecting a distribution of contact pressure. Such sensor is disclosed in Japanese Patent Laying Open No. 62-297735.

In FIG. 7, piezo-electric elements $1a$, $1b$, ... are arranged in a matrix of 5 rows and 5 columns. Connection lines $A_1$, $A_2$, ... disposed in each row are each electrically connected to upper electrodes of piezo-electric elements $1a$, $1b$, ... in each row, and connection lines $B_1$, $B_2$, ... disposed in each column are each electrically connected to lower electrodes of the piezo-electric elements $1a$, $1b$, ... in each column.

In the structure of FIG. 7, one connecting line is provided in each row or each column, so that compared with a structure in which a connecting line is provided to each piezo-electric element, the number of connecting lines can be reduced to simplify a switching circuit for selecting a piezo-electric element to be used for a measurement.

If a pressure in a certain piezo-electric element $1a$, for example, is to be measured, in the above conventional piezo-electric type of pressure-distribution sensor, a potential based on a distortion caused in the piezo-electric element $1a$ is measured through the connection lines $A_1$ and $B_1$.

On the other hand, in this structure, another closed circuit between connection lines $A_1$ and $B_1$ consisting of connection line $A_1$—piezo-electric element $1b$—connection line $B_2$—piezo-electric element $1c$—connection line $A_2$—piezo-electric element $1d$—connection line $B_1$ is formed at the same time. Accordingly, when measuring the potential in the piezo-electric element $1a$, the potentials in such elements as $1b$, $1c$ and $1d$ forming the above mentioned closed circuit affect the result of measurement.

Thus, in the above conventional structure, a pressure cannot be detected correctly due to interference of piezo-electric elements other than that to be measured.

SUMMARY OF THE INVENTION

An object of the present invention is to provide a piezo-electric type of pressure sensor in which interference coused by piezo-electric elements other than that to be measured can be prevented so that pressure can be correctly detected without providing a connecting line to each element.

Another object of the present invention is to provide a piezo-electric type of pressure sensor in which a switching circuit for selecting a piezo-electric element in which charge is to be measured is simplified.

A further object of the present invention is to provide a pressure detecting device in which interference coused by piezo-electric elements other than that to be measured is prevented so as to allow correct detection of pressure.

A piezo-electric type of pressure sensor according to the present invention comprises a plurality of sensor elements arranged in a first direction and a second direction intersecting therewith. Each sensor element comprises a piezo-electric element and a switching means connected thereto. In addition, the piezo-electric type of pressure sensor according to the present invention comprises a plurality of control lines extending in the first direction for causing switching means of each piezo-electric sensor element arranged in the first direction to be conductive or non-conductive; and a plurality of reading lines extending in the second direction and connected to said switching means of each piezo-electric sensor element arranged in the second direction for reading a charge from a piezo-electric element through a switching means that is rendered conductive through a control line.

The pressure-detecting means according to the present invention comprises the above-described piezo-electric pressure sensor; selecting means for selecting one of said plurality of control lines to select a piezo-electric element whose output voltage is to be read among a plurality of columns of piezo-electric sensor elements arranged in the first direction; and accumulating means for accumulating a pressure voltage based on an output voltage read out from the selected piezo-electric element.

When detecting a contact pressure in a particular sensor element of a plurality of sensor elements arranged in a matrix, by employing the control lines for controlling switching means of the sensor element, a corresponding reading line is connected to a piezo-electric element of the sensor element, whereby a charge amount generated in the piezo-electric element is detected through the reading line.

In a detecting operation, if switching means in the remaining sensor elements are cut off, piezo-electric elements of the sensor elements do not interfere with measurement of pressure. Accordingly, in each sensor element arranged in a matrix, each pressure can be detected correctly.

By sequentially switching the control lines and the reading lines, a pressure in each arbitrary piezo-electric element can be measured in succession without interference from other piezo-electric elements, thereby allowing sequential detecting of a pressure in each piezo-electric element so as to read a pressure distribution.

On the other hand, the number of connecting lines to be externally connected corresponds to the arranged control lines and reading lines, so that the number of connecting line materials can be decreased; as well as in the above conventional arrangement of FIG. 7, to simplify a switching circuit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
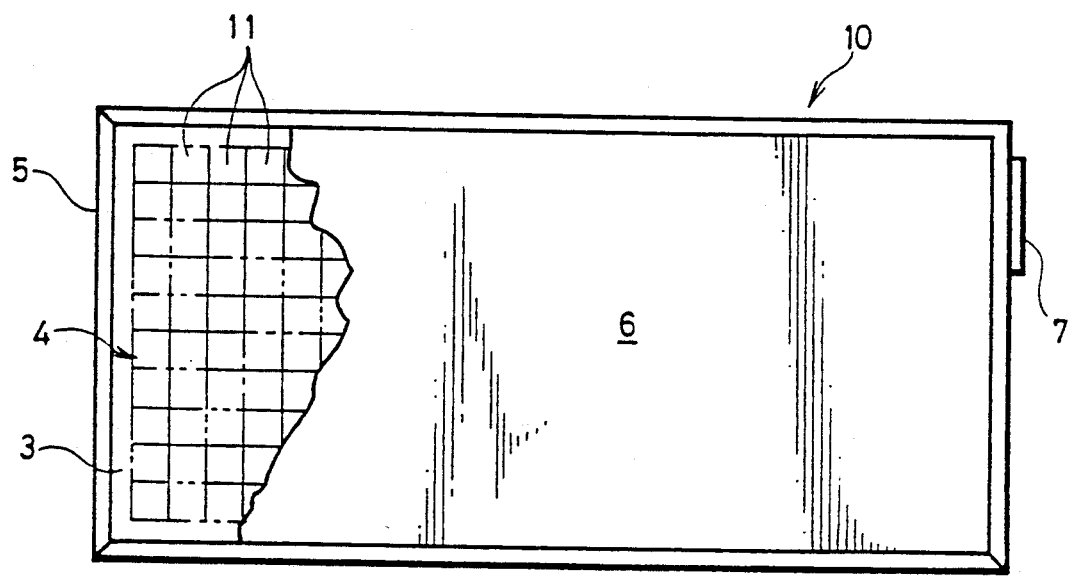
FIG. 1 is a plan view, partly in section, showing a piezo-electric type of pressure sensor of one embodiment of the present invention.
Figure 2:
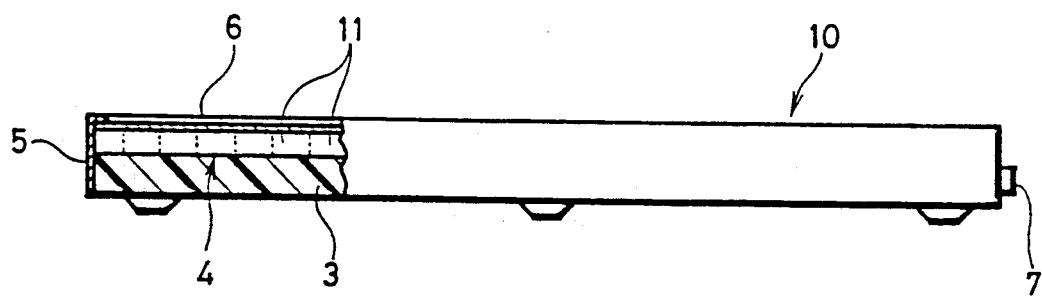
FIG. 2 is a side view, partly in section, showing the piezo-electric type of pressure sensor of the disclosed embodiment of the present invention.

Referring to FIGS. 1 and 2, a piezo-electric type of pressure sensor 10 comprises a support member 3. The support member 3 has a rectangular and flat upper surface, and is principally formed of bakelite, and a group of sensor elements 4 in which sensor elements 11 are arranged in a matrix is fixed on the support member. A detachable frame 5 is attached on the periphery of the support member 3. A pressure plate 6 is disposed in an opening of the frame 5. The pressure plate 6 is flexible so as to press upper surfaces of the group of sensor elements 4, and a periphery of the pressure plate 6 is fixed to the frame 5. An input/output connector 7 is provided on one longitudinal end of the piezo-electric type of pressure sensor 10.

Figure 3:
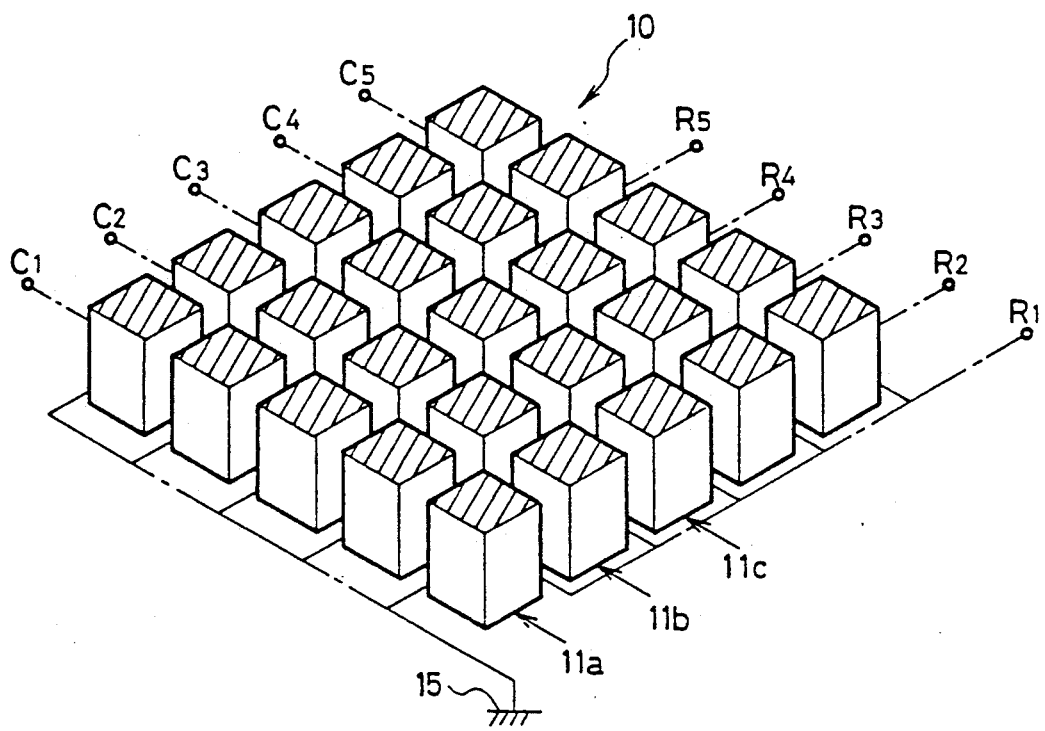
FIG. 3 is a perspective view showing a schematic structure of the piezo-electric type of pressure sensor of the disclosed embodiment of the present invention.

In FIG. 3, sensor elements $11a$, $11b$, $11c$ ... arranged in 5 rows and 5 columns are shown. In FIG. 3, control lines $C_1$ through $C_5$ disposed in each row are each electrically connected to one of a pair of electrodes of each sensor element, while reading lines $R_1$ through $R_5$ disposed in each column are each electrically connected to the other of the pair of electrodes of each sensor element. In FIG. 3, twenty-five sensor elements are provided, the control lines and the reading lines are respectively number five, so that a total of ten connecting lines may be provided.

Figure 4:
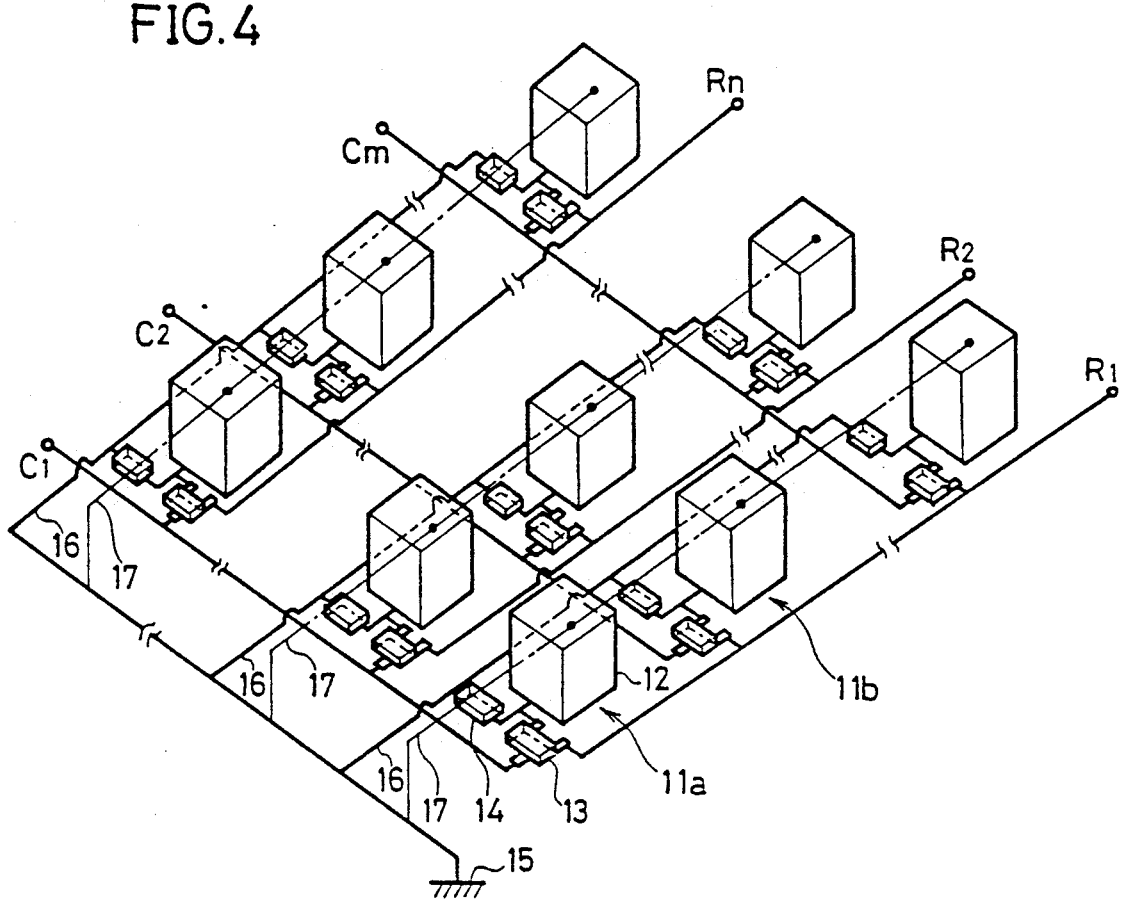
FIG. 4 is a perspective view showing a detailed structure of the piezo-electric type of pressure sensor shown in FIG. 3.

Referring to FIG. 4, each sensor element $11a$, $11b$, ... comprises a piezo-electric element 12, a field effect transistor 13, and a capacitor 14. Corresponding to an arrangement of respective sensor elements $11a$, $11b$, ... arranged in a matrix, the control lines $C_1$, $C_2$, ... are disposed in each row, while the reading lines $R_1$, $R_2$, ... is disposed in each column. In addition, two connecting lines 16 and 17 connected to a ground 15 are disposed in each column.

Figure 5:
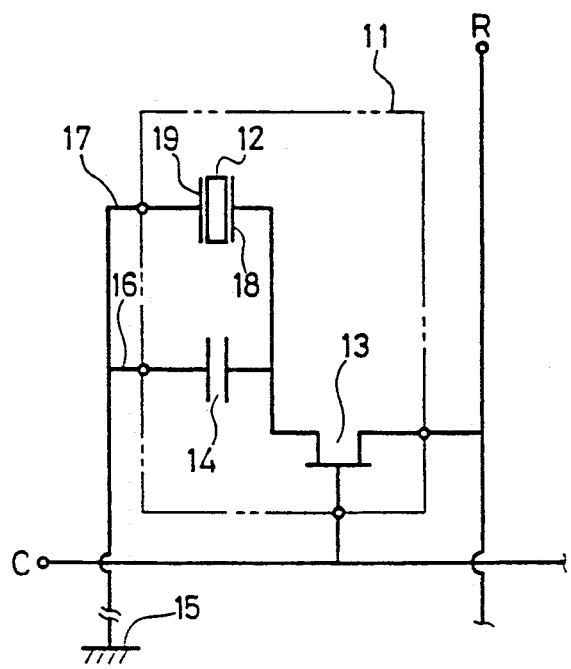
FIG. 5 is an equivalent circuit diagram of the sensor element shown in FIG. 4.
Figure 7:
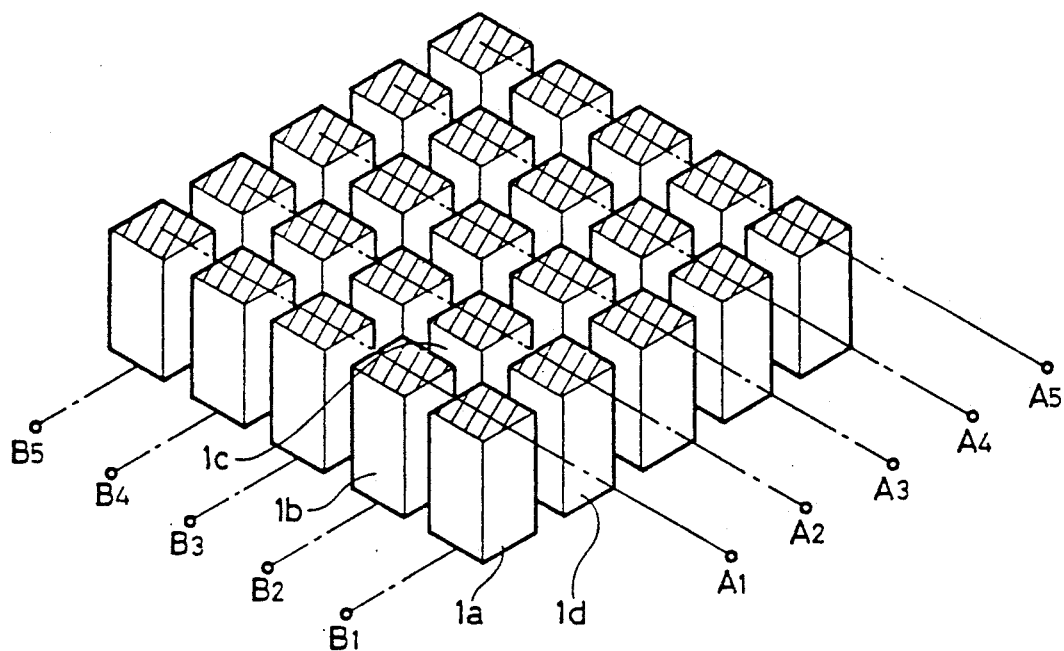
FIG. 7 is a perspective view showing a schematic structure of a piezo-electric type of pressure sensor of the background of the present invention.

FIG. 5 shows an equivalent circuit of one of the sensor elements 11. In FIG. 5, a gate electrode of the field effect transistor 13 is connected to a control line C. Either the source or the drain electrode of the transistor 13 is connected to a reading line R, and the other of the source or the drain electrode is connected to an electrode 18 formed on one side of a piezo-electric element 12. An electrode 19 formed on the other side of the piezo-electric element 12 is connected to a connecting line 17 leading to the ground 15. A capacitor 14 is connected between the electrode 18 on one side of the piezo-electric element 12 and a connecting line 16 leading to the ground 15. More specifically, the capacitor 14 is connected in parallel with the piezo-electric element 12. The piezo-electric element 12 as employed comprises an element formed of piezo-electric materials having high rigidity, such as a piezo-electric ceramic or a piezo-electric monocrystal.

Figure 6:
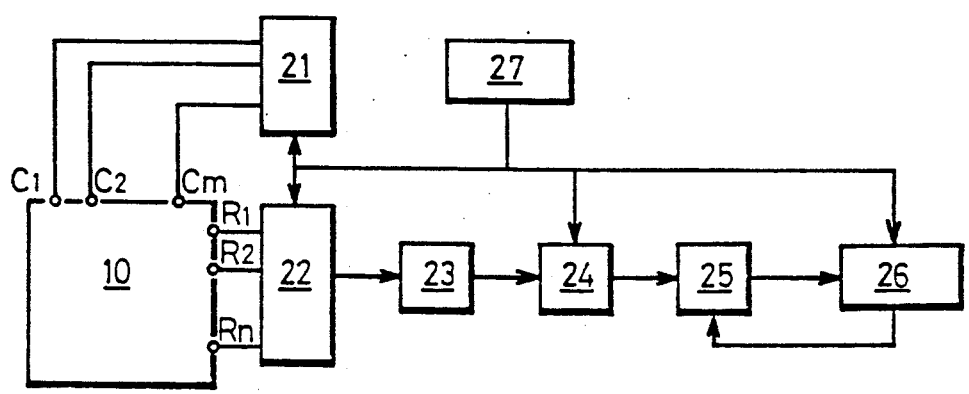
FIG. 6 is a schematic block diagram showing a pressure distribution detecting device in which a piezo-electric type of pressure sensor of the disclosed embodiment of the present invention is incorporated.

The above-described piezo-electric type of pressure sensor 10 is incorporated in, for example, a pressure-distribution detecting device as shown in FIG. 6.

In FIG. 6, control lines $C_1$, $C_2$ ..., of the piezo-electric type of pressure sensor 10 are connected to a control line switching circuit 21, while reading lines $R_1$, $R_2$, ... are connected to a reading line switching circuit 22. The reading line switching circuit 22 is connected to an integrating circuit 23, which is in turn connected to a peak hold circuit 24. The peak hold circuit 24 is connected to a data processing device 26 through an A/D converter 25. In addition, the detecting device of FIG. 6 comprises a matrix control circuit 27. The matrix control circuit 27 controls the control line switching circuit 21 and the reading line switching circuit 22, and transmits a reset signal to the peak hold circuit 24 with a predetermined timing and an element switching information signal to the data processing device. The data processing device 26 transmits to the A/D converter 25 a control signal for controlling the A/D converter 25.

Now, the operation of the piezo-electric type of pressure sensor incorporated in the pressure distribution detecting device of FIG. 6 is described.

The transistors 13 (FIG. 5) connected to the control line $C_1$ are rendered conductive by means of the matrix control circuit 27 through the control line switching circuit 21. At this time, the other control lines $C_2$, $C_3$, ... are non-conductive. As a result, a charge generated by pressure in the sensor elements in a row corresponding to the control line $C_1$ becomes readable through the reading lines $R_1$, $R_2$, ....

Then, first of all, only the reading line R1 is connected to the integrating circuit 23 by means of the reading line switching circuit 22. At this time, the remaining reading lines $R_2$, $R_3$, ... are open-circuited, so that information in the sensor elements corresponding to the lines $R_2$, $R_3$ ... is held.

When the reading line $R_1$ is connected to the integrating circuit 23, charge in a piezo-electric element selected by the control line $C_1$ is discharged to the integrating circuit 23. If the discharged charge is temporally integrating in the integrated circuit 23, the amount of charge generated by a pressure in the sensor element can be measured and, in a later stage, be inputted into the data processing device 26 through the peak hold circuit 24 and the A/D converter 25.

Thereafter, each of the reading lines $R_2$, $R_3$, ... is switched until detection through all the reading lines is finished. Then, only the control line $C_2$ is rendered conductive, whereby, similar to the above operation, reading information from each sensor element arranged in the row corresponding to the control line $C_2$ is read through the reading lines $R_1$, $R_2$, ... and then stored in the data processing device.

More specifically, in the above-described pressure-distribution detecting device, when an unknown object presses the upper surfaces of the respective piezo-electric elements 12, the pressure applied by the object causes piezo-electric effects in the corresponding piezo-electric elements 12, so that pressures on respective sensor elements can be detected by sequentially switching the control lines $C_1$, $C_2$, ... and the reading lines $R_1$, $R_2$, .... Accordingly, a pressure distribution based on the unknown object pressing the piezo-electric type of pressure sensor 10 can be detected.

The means for switching of control lines and reading lines is not limited to the above described means, but any other selections of means for switching may be possible. In addition, when the number of reading lines is not so large, integrating circuits and peak hold circuits may be provided at respective reading lines.

Although the present invention has been described and illustrated in detail, it is clearly understood that the same is by way of illustration and example only and is not to be taken by way of limitation; the spirit and scope of the present invention being limited only by the terms of the appended claims.

What is claimed is:

1. A piezo-electric type of pressure distribution detecting device comprising a piezo-electric type of pressure sensor, said piezo-electric type of pressure sensor comprising:

a plurality of piezo-electric elements arranged in a first direction and a second direction intersecting therewith for outputting voltages corresponding to pressure changes;

switching means provided in each piezo-electric element and connected to said piezo-electric element, said switching means assuming a conductive state or a non-conductive state, a plurality of control lines extending in said first direction for causing switching means of each piezo-electric element arranged in the first direction to be conductive or non-conductive;

a plurality of reading lines extending in said second direction and connected to said switching means of each piezo-electric element arranged in the second direction for reading a charge from a piezo-electric element through a switching means that is rendered conductive through a control line;

selecting means for selecting one of said plurality of control lines to select a piezo-electric element whose output voltage is to be read among a plurality of columns of piezo-electric sensor elements arranged in the first direction; and accumulating means for accumulating a pressure value based on an output voltage read through a reading line from a piezo-electric element selected by means of said selecting means.

2. A piezo-electric type of pressure sensor according to claim 1, wherein said piezo-electric element is formed of a piezo-electric ceramic material having rigidity.

3. A piezo-electric type of pressure sensor according to claim 1, wherein said piezo-electric element is formed of a piezo-electric monocrystal material having rigidity.

4. A piezo-electric type of pressure sensor, comprising:

a plurality of piezo-electric sensor elements arranged in a first direction and a second direction intersecting therewith;

each piezo-electric sensor element comprising a piezo-electric element which generates a charge corresponding to an external pressure applied to said piezo-electric element;

switching means connected to each said piezo-electric element, said switching means assuming a conductive state or a non-conductive state;

a plurality of control lines corresponding to said first direction for causing said switching means of respective groups of said piezo-electric sensor elements arranged in the first direction to be conductive or non-conductive; and a plurality of reading lines corresponding to said second direction and connected to said switching means of respective groups of said piezo-electric sensor elements arranged in the second direction for reading external pressures applied to said piezo-electric elements as a function of charges generated by said piezo-electric elements, in response to said external pressures, through switching means rendered conductive by said control lines.

5. A piezo-electric pressure distribution detecting device comprising:

a plurality of piezo-electric elements arranged in an array which extends in a first direction and a second direction, wherein each said piezo-electric element generates a respective voltage in response to pressure applied to said piezo-electric element;

a respective switching means connected to each said piezo-electric element for receiving said voltage generated thereby, each said switching means having a conductive state and a non-conductive state;

a plurality of control lines, each said control line being connected to said switching means of a respective group of said piezo-electric elements arranged in said first direction, for controlling said switching means to be in said conductive or non-conductive state;

a plurality of reading lines, each said reading line being connected to the switching means of a respective group of said piezo-electric elements arranged in said second direction, for reading said voltage generated by said piezo-electric elements when said switching means of said respective elements are in their conductive state;

selecting means for selecting a group of said piezo-electric elements arranged in said first direction from which an output voltage is to be read, by selecting the respective control line of said group of piezo-electric elements; and accumulating means for receiving an output voltage from said selected group of piezo-electric elements through one of said reading lines, and accumulating said output voltage to indicate a detected value of said pressure applied to said piezo-electric pressure distribution detecting device.

6. A detecting device as in claim 5, wherein said selecting means also selects one of said reading lines so as to select said piezo-electric element from which said output voltage is to be received by said accumulating means.

7. A detecting device as in claim 6, further comprising processing means for processing said detected pressure value accumulated by said accumulating means.

8. A detecting device as in claim 7, further comprising matrix control means for controlling said selecting means and said processing means for detecting and processing said pressure values in a predetermined manner.

9. A detecting device as in claim 8, wherein said matrix control means causes said pressure values from all of said piezo-electric elements to be detected and processed continuously in a predetermined sequence.

10. A detecting device as in claim 8, wherein said processing means includes a peak-hold circuit which receives an output of said accumulating means.

11. A detecting device as in claim 10, wherein said matrix control means issues a reset signal to said peak-hold circuit with a predetermined timing.

12. A detecting device as in claim 10, wherein said processing means further includes a data processor which receives an output of said peak-hold circuit.

13. A detecting device as in claim 12, wherein said matrix control means issues an element-switching information signal to said data processor to indicate which piezo-electric element has been read to generate a detected pressure value.

14. A piezo-electric pressure distribution detecting device comprising:
- a plurality of piezo-electric elements arranged in an array which extends in a first direction and a second direction, wherein each said piezo-electric element generates a respective voltage in response to pressure applied to said piezo-electric element;
- a respective switching means connected to each said piezo-electric element for receiving said voltage generated thereby, each said switching means having a conductive state and a non-conductive state;
- a plurality of control lines, each said control line being connected to said switching means of a respective group of said piezo-electric elements arranged in said first direction, for controlling said switching means to be in said conductive or non-conductive state;
- a plurality of reading lines, each said reading line being connected to the switching means of a respective group of said piezo-electric elements arranged in said second direction, for reading said voltage generated by said piezo-electric elements when said switching means of said respective elements are in their conductive state;
- selecting means for selecting a group of said piezo-electric elements arranged in said first direction from which an output voltage is to be read, by selecting the respective control line of said group of piezo-electric elements; and
- storage means connected to said selected group of piezo-electric elements for storing said output voltage generated by said selected group of piezo-electric elements.

15. A detecting device as in claim 14, wherein said storage means comprises a capacitance connected across each said piezoelectric element for storing said respective output voltage generated thereby.

16. A detecting device as in claim 14, wherein said storage means comprises accumulating means for receiving an output voltage from said selected group of piezo-electric elements through one of said reading lines, and accumulating said output voltage to indicate a detected value of said pressure applied to said piezoelectric pressure distribution detecting device.

17. A piezo-electric pressure distribution detecting device comprising:
- a plurality of piezo-electric elements arranged in an array which extends in a first direction and a second direction, wherein each said piezo-electric element generates a respective voltage in response to pressure applied to said piezo-electric element;
- a respective switching means connected to each said piezo-electric element for receiving said voltage generated thereby, each said switching means having a conductive state and a non-conductive state;
- a plurality of control lines, each said control line being connected to said switching means of a respective group of said piezo-electric elements arranged in said first direction for controlling said switching means to be in said conductive or non-conductive state;
- a plurality of reading lines, each said reading line being connected to the switching means of a respective group of said piezo-electric elements arranged in said second direction, for reading said voltage generated by said piezo-electric elements when said switching means of said respective elements are in their conductive state; and
- a capacitance connected across each said piezoelectric element for storing said respective voltage generated thereby.

* * * * *